US012806939B2

(12) United States Patent
Harada

(10) Patent No.: US 12,806,939 B2
(45) Date of Patent: Nov. 24, 2026

(54) MOTORCYCLE TIRE

(71) Applicant: BRIDGESTONE CORPORATION, Tokyo (JP)

(72) Inventor: Yoichi Harada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 31 days.

(21) Appl. No.: 18/880,680

(22) PCT Filed: Jul. 3, 2023

(86) PCT No.: PCT/JP2023/024669
§ 371 (c)(1),
(2) Date: Jan. 2, 2025

(87) PCT Pub. No.: WO2024/009964
PCT Pub. Date: Jan. 11, 2024

(65) Prior Publication Data

US 2025/0388051 A1 Dec. 25, 2025

(30) Foreign Application Priority Data

Jul. 4, 2022 (JP) ................................ 2022-107933

(51) Int. Cl.
*B60C 11/03* (2006.01)
*B60C 11/117* (2006.01)
*B60C 11/13* (2006.01)

(52) U.S. Cl.
CPC ........ *B60C 11/0302* (2013.01); *B60C 11/032* (2013.01); *B60C 11/033* (2013.01);
(Continued)

(58) Field of Classification Search
CPC . B60C 11/0302; B60C 11/032; B60C 11/033; B60C 2011/0334;
(Continued)

(56) References Cited

U.S. PATENT DOCUMENTS

2004/0123930 A1* 7/2004 Nakamura ............. B29D 30/70
152/531
2010/0193095 A1* 8/2010 Nakagawa .......... B60C 11/0311
152/209.5
(Continued)

FOREIGN PATENT DOCUMENTS

CN 115027183 A 9/2022
EP 3362301 B1 7/2019
(Continued)

OTHER PUBLICATIONS

Machine translation for Japan 2015-174564 (Year: 2026).*
(Continued)

*Primary Examiner* — Steven D Maki
(74) *Attorney, Agent, or Firm* — Sughrue Mion, PLLC

(57) ABSTRACT

To provide a motorcycle tire enhanced in steering stability, particularly, the feeling of falling during rolling. A motorcycle tire in which a directional pattern including at least one center main groove 11 is provided on a tread surface portion. A negative rate of the entire tread surface portion is 10% or less, and a ratio Gs/Gc between shear rigidity Gs at a position of ¼ of a tread width TW from a tread edge TE as measured in a tire width direction and shear rigidity Gc at a
(Continued)

position of ½ of a tread width TW from a tread edge TE as measured in a tire width direction, in the tread surface portion, is 95% to 100%.

18 Claims, 6 Drawing Sheets

(52) U.S. Cl.
CPC ................. *B60C 2011/0334* (2013.01); *B60C 2011/0374* (2013.01); *B60C 2011/0376* (2013.01); *B60C 2011/1361* (2013.01); *B60C 2200/10* (2013.01)

(58) Field of Classification Search
CPC ..... B60C 2011/0374; B60C 2011/0376; B60C 2011/1361
See application file for complete search history.

(56) References Cited

U.S. PATENT DOCUMENTS

| | | | | |
|---|---|---|---|---|
| 2012/0118456 | A1* | 5/2012 | Schiavolin | B60C 11/0302 152/209.1 |
| 2013/0014869 | A1* | 1/2013 | Makioka | B60C 11/032 152/209.11 |
| 2016/0075187 | A1* | 3/2016 | Kubo | B60C 11/0327 152/209.24 |
| 2016/0167441 | A1 | 6/2016 | Takenaka | |
| 2020/0282775 | A1 | 9/2020 | Hikita | |
| 2022/0258537 | A1* | 8/2022 | Noguchi | B60C 9/06 |
| 2023/0339269 | A1* | 10/2023 | Harada | B60C 11/0302 |

FOREIGN PATENT DOCUMENTS

| | | | | |
|---|---|---|---|---|
| EP | 3 932 695 | A1 | | 1/2022 |
| JP | 2015-24796 | A | | 2/2015 |
| JP | 2015-48051 | A | | 3/2015 |
| JP | 2015-174564 | A | * | 10/2015 |
| JP | 2018-39333 | A | | 3/2018 |
| JP | 2018-135004 | A | | 8/2018 |
| JP | 2020-138698 | A | | 9/2020 |
| JP | 2021-49836 | A | | 4/2021 |
| JP | 2021-49837 | A | | 4/2021 |
| JP | 2013-116709 | A | | 6/2023 |
| WO | WO-2021/060033 | A1 | * | 4/2021 |

OTHER PUBLICATIONS

International Search Report for International Application No. PCT/JP2023/024669 dated Oct. 3, 2023.

Extended European Search Report dated Sep. 8, 2025, issued in European application No. 23835496.3.

* cited by examiner

MOTORCYCLE TIRE

CROSS REFERENCE TO RELATED APPLICATIONS

This is a National Stage Application of International Application No. PCT/JP2023/024669 filed Jul. 3, 2023, claiming priority based on Japanese Patent Application No. 2022-107933 filed Jul. 4, 2022.

TECHNICAL FIELD

The present invention relates to a motorcycle tire (hereinafter, also simply referred to as "tire"), specifically relates to a motorcycle tire concerning improvement of a tread pattern provided on a tread surface portion, particularly relates to a motorcycle pneumatic tire.

BACKGROUND ART

Since two-wheelers have the property of rounding by tilting of bodies thereof unlike four-wheelers such as passenger cars and trucks/buses, tires for two-wheelers have tire crown portions having small curvature radii as compared with those of tires for four-wheelers and have tire shapes in which cross sections are round as compared with tires for four-wheelers. Therefore, in the case of tires for two-wheelers, central portions of treads are mainly contacted with the ground during straight running of vehicles, and shoulder portions of treads are contacted with the ground during rounding of vehicles.

As a prior art concerning improvement of tread patterns of tires for two-wheelers, for example, Patent Document 1 discloses a motorcycle tire in which not only two or more widened portions broadening outward in the groove width direction are provided on at least one of a groove wall at the first arrival side in the rotation direction and a groove wall at the rear arrival side in the rotation direction, of at least one main groove among main grooves provided on a tread portion, but also at least one main groove among these main grooves shallows outward in the tread width direction.

Patent Document 2 discloses a motorcycle tire in which three or more widened portions broadening outward in the groove width direction are provided on at least one of a groove wall at the first arrival side in the rotation direction and a groove wall at the rear arrival side in the rotation direction, of at least one main groove among main grooves provided on a tread portion, but also at least one position is possessed in which the extending length along a groove wall between vertexes of adjacent widened portions is longer than the length of a virtual straight line connecting the vertexes of adjacent widened portions, by 0.3 to 50%. An object of each of the techniques disclosed in Patent Documents 1 and 2 is to provide a motorcycle tire which is enhanced in drainage performance and which satisfies both dry performance and wet performance.

RELATED ART DOCUMENTS

Patent Documents

Patent Document 1: JP 2021-049837 A
Patent Document 2: JP 2021-049836 A

SUMMARY OF THE INVENTION

Problems to be Solved by the Invention

Some motorcycle tires have been conventionally set to be high in rigidity of center portions and low in rigidity of shoulder portions, and there has been room for improvement in steering stability, particularly, the feeling of falling during rolling. Such a viewpoint has not been studied also in the tires disclosed in Patent Documents 1 and 2.

An object of the present invention is to provide a motorcycle tire enhanced in steering stability, particularly, the feeling of falling during rolling.

Means for Solving the Problems

The present inventor has made intensive studies, and as a result, has found that the above problems can be solved by not only providing at least one center main groove on a tread surface portion, but also allowing the negative rate of the tread surface portion and the shear rigidity in the tire width direction to satisfy the following conditions, and thus has led to completion of the present invention.

Specifically, the present invention is as follows.

(1) A motorcycle tire in which a directional pattern including at least one center main groove is provided on a tread surface portion, wherein
a negative rate of the entire tread surface portion is 10% or less, and
a ratio Gs/Gc between shear rigidity Gs at a position of ¼ of a tread width TW from a tread edge as measured in a tire width direction and shear rigidity Gc at a position of ½ of a tread width TW from a tread edge as measured in a tire width direction, in the tread surface portion, is 95% to 100%.

(2) The motorcycle tire according to (1), wherein the center main groove is placed not so as to traverse a tire equatorial plane.

(3) The motorcycle tire according to (1) or (2), wherein, when a ground contact surface during straight running is defined as a center region and paired regions located outside the center region in a tire width direction are each a shoulder region in the tread surface portion, a ratio Nc/Ns between a negative rate Nc of the center region and a negative rate Ns of the shoulder region is 40% to 120%.

(4) The motorcycle tire according to any one of (1) to (3), wherein a distance d between the center main grooves placed by sandwiching a tire equatorial plane corresponds to 1% to 20% of the tread width TW.

(5) The motorcycle tire according to any one of (1) to (4), wherein an angle θ1 of an extending direction to a tire circumferential direction of the center main groove is 0° to 30°.

(6) The motorcycle tire according to any one of (1) to (5), wherein, when ends in a tire circumferential direction of the center main groove are connected to provide a line segment and a point at which a perpendicular line to a midpoint of the line segment and an inside groove wall in a tire width direction of the center main groove intersect is defined as X, an angle θ2 between two straight lines connecting the point X and the respective ends in a tire circumferential direction of the center main groove is 0° to 40°.

(7) The motorcycle tire according to any one of (1) to (6), wherein at least one of the center main grooves has two or more widened portions in which at least one of an outside groove wall in a tire width direction and an inside groove wall in a tire width direction broadens outside in a groove width direction, and, when a maximum value of groove widths in the widened portions is defined as a maximum groove width W, a minimum groove width w being a minimum value of groove widths of depressed portions formed between the widened portions is 20% to 60% of the maximum groove width W.

(8) The motorcycle tire according to any one of (1) to (7), wherein an overlap length of the center main grooves placed by sandwiching a tire equatorial plane, in a tire circumferential direction, is 10% to 90% of a length Lg of each of the center main grooves in a tire circumferential direction.

(9) The motorcycle tire according to any one of (1) to (8), wherein at least one of the center main grooves has one or more widened portions in which at least one of an outside groove wall in a tire width direction and an inside groove wall in a tire width direction broadens outside in a groove width direction, and a raised portion is provided on a groove bottom of each of the widened portions.

(10) The motorcycle tire according to any one of (1) to (9), wherein the tread surface portion further has a shoulder main groove, and an angle θ3 of an extending direction to a tire circumferential direction of the shoulder main groove is 20° to 60°.

(11) The motorcycle tire according to any one of (1) to (10), wherein the tread surface portion further has a shoulder main groove, and an angle θ3 of an extending direction to a tire circumferential direction of the shoulder main groove is larger than an angle θ1 of an extending direction to a tire circumferential direction of the center main groove.

Effects of the Invention

According to the present invention, the above configuration has enabled a motorcycle tire enhanced in steering stability, particularly, the feeling of falling during rolling to be realized.

MODE FOR CARRYING OUT THE INVENTION

Hereinafter, embodiments of the present invention are described in detail with reference to the drawings.

Figure 1:
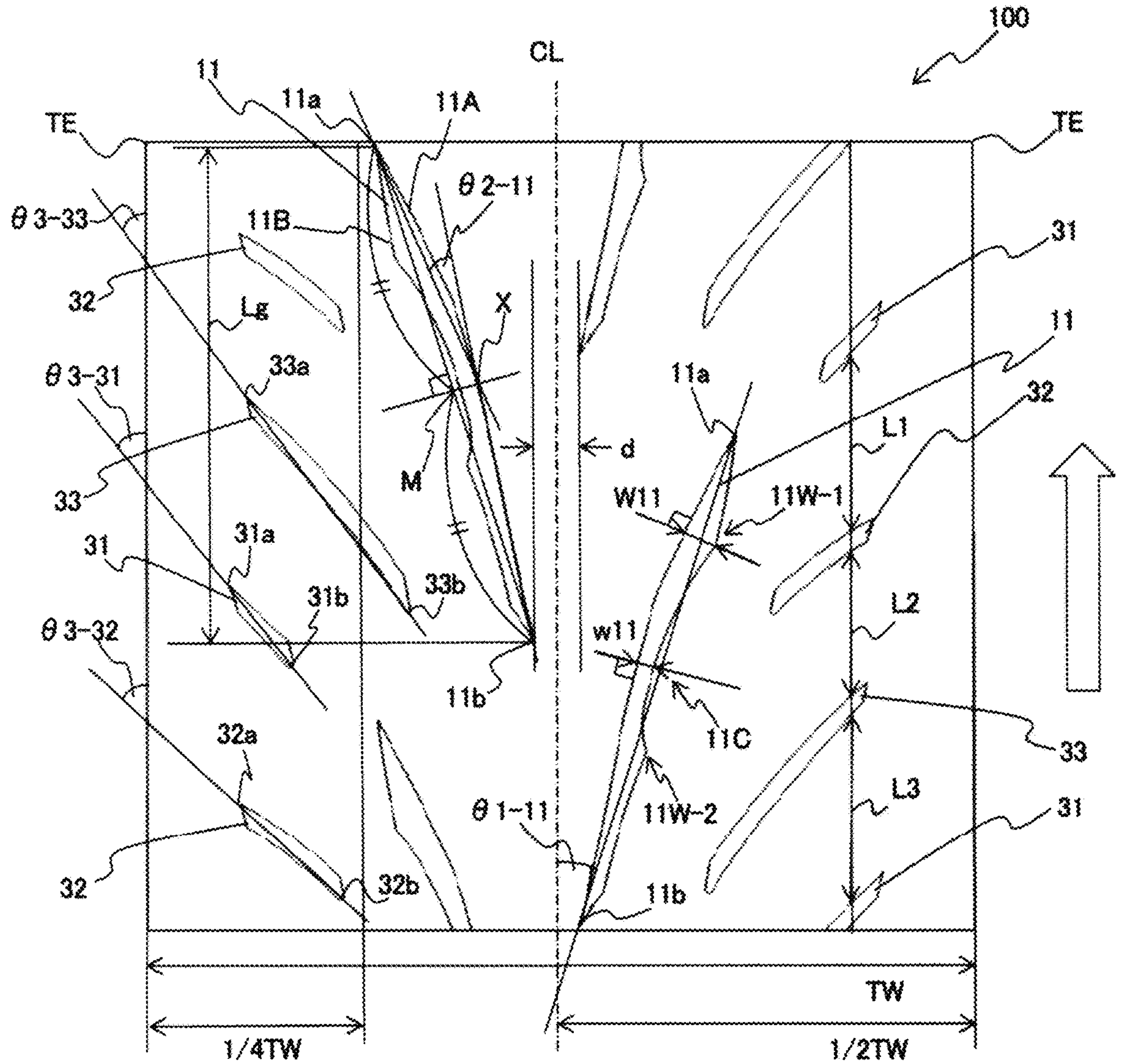
FIG. 1 A partially developed view illustrating a tread surface portion of a front tire as one example of the motorcycle tire of the present invention.
Figure 2:
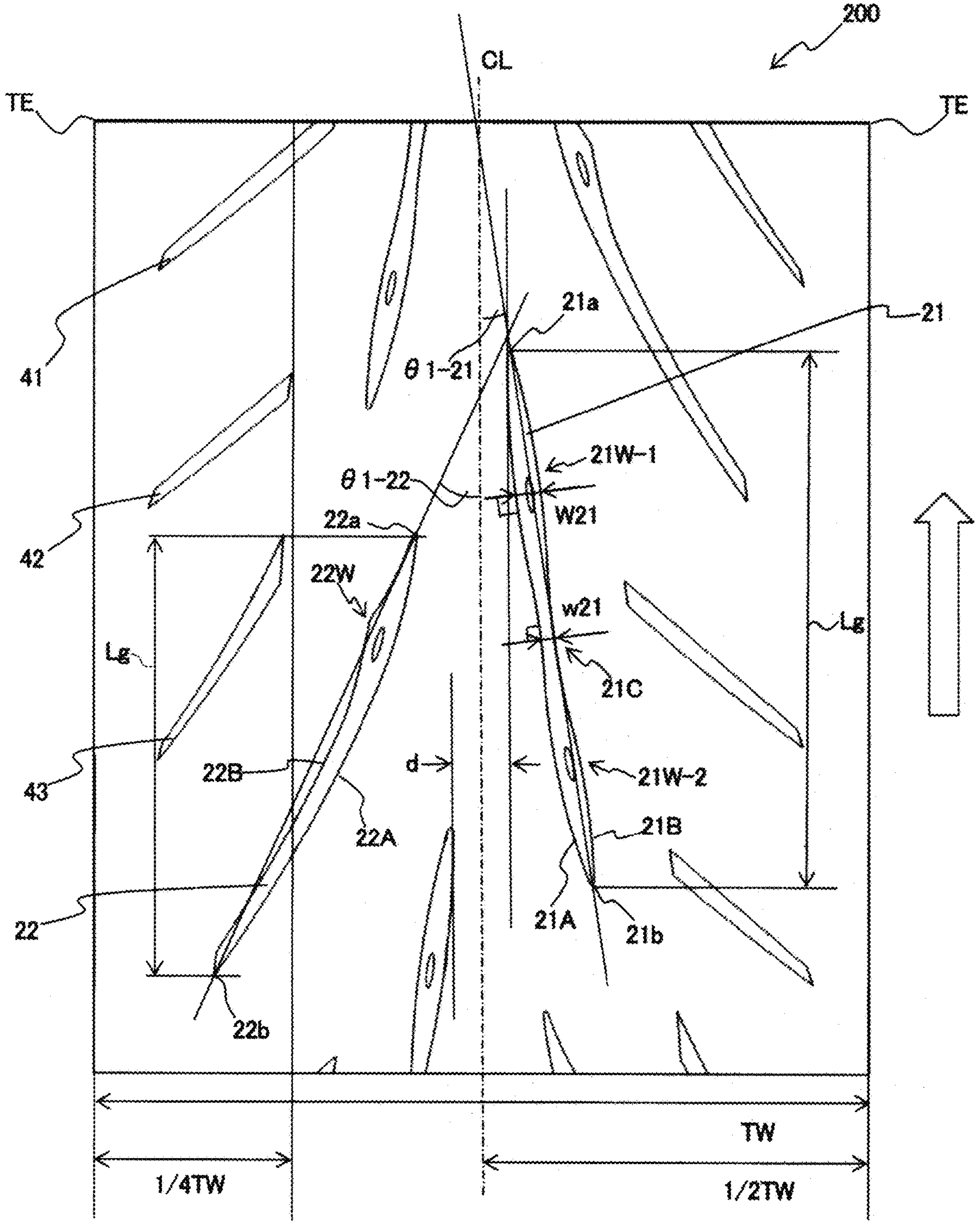
FIG. 2 A partially developed view illustrating a tread surface portion of a rear tire as another example of the motorcycle tire of the present invention.
Figure 3:
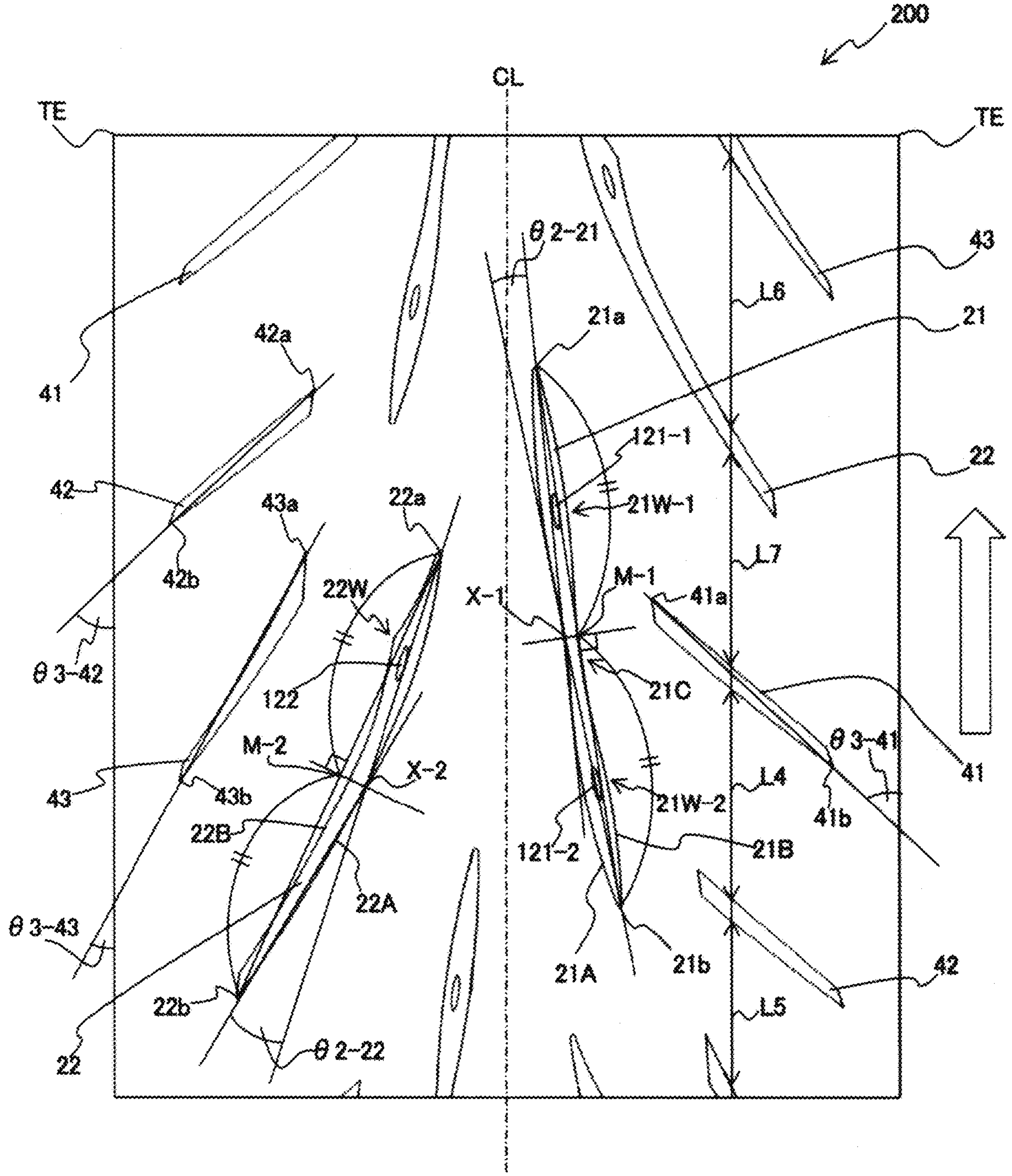
FIG. 3 Another partially developed view illustrating a tread surface portion of a rear tire as another example of the motorcycle tire of the present invention.

FIG. 1 is a partially developed view illustrating a tread surface portion of a front tire as one example of the motorcycle tire of the present invention. FIGS. 2 and 3 are each a partially developed view illustrating a tread surface portion of a rear tire as another example of the motorcycle tire of the present invention. Each arrow in FIGS. 1 to 3 indicates a tire rotation direction.

In the motorcycle tire of the present invention, a directional pattern including at least one center main groove is provided on a tread surface portion. One center main groove 11 is placed on a tread surface portion in a front tire 100 illustrated in FIG. 1, and two center main grooves 21 and 22 are placed on a tread surface portion in a rear tire 200 illustrated in each of FIGS. 2 and 3. These center main grooves are each placed not so as to traverse a tire equatorial plane CL. A configuration in which these center main grooves do not traverse the tire equatorial plane CL can be adopted to improve straight-running stability.

In the present invention, the center main groove means a main groove in which 80% or more of the area of the groove is included in a ground contact surface during straight running. In addition, in the present invention, the ground contact surface during straight running means a ground contact surface in straight running of the tire which is fitted to an applicable rim and which is in a state where a specified inner pressure is charged and a specified load is applied.

In the foregoing, the applicable rim means a standard rim of an applicable size, which is prescribed by a valid industrial standard in a locality in which the tire is produced and used, the specified inner pressure means an air pressure corresponding to the maximum load ability at an applicable size/ply rating, which is prescribed in the industrial standard, and the specified load means the maximum mass permitted to be applied to the tire, which is prescribed in the industrial standard. The industrial standard is, for example, the JATMA YEAR BOOK of JATMA (Japan Automobile Tire Manufacturers Association) in Japan, the STANDARD MANUAL of ETRTO (The European Tyre and Rim Technical Organisation) in Europe, or the YEAR BOOK of TRA (The Tire and Rim Association Inc.) in USA.

In the present invention, the ground contact surface during straight running specifically refers to a belt-like range having a width corresponding to 20% to 40% of the tread width TW with the tire equatorial plane CL as the center.

The tread width TW means a distance in the tire width direction between both tread edges TE, as measured along a tread surface in no load state where the tire is fitted to an applicable rim and a specified inner pressure is charged. Similarly, various dimensions of the tire of the present invention refer to values measured in no load state where the tire is fitted to an applicable rim and a specified inner pressure is charged, unless particularly noted.

In the tire of the present invention, the negative rate of the entire tread surface portion is 10% or less, and the ratio Gs/Gc between the shear rigidity Gs at a position of ¼ of the tread width TW from the tread edge TE as measured in the tire width direction and the shear rigidity Gc at a position of ½ of the tread width TW from the tread edge TE, namely, in the tire equatorial plane CL as measured in the tire width direction, in the tread surface portion, is 95% to 100%, as expressed in percentage.

The negative rate is a proportion of the area of a groove relative to the area of a groove-free tread surface portion which is assumed, and means a proportion of a groove portion excluding any sipe, in the area of the tread surface portion.

In addition, in the present invention, the shear rigidity Gs and the shear rigidity Gc of the tread surface portion are each a value representing the pattern rigidity determined by a tread pattern formed with grooves, sipes, or the like provided on the tread surface portion, and is calculated with a finite element method (FEM). Specifically, a three-dimensional model of only a tread pattern is made with a tetrahedron element of about 3 mm on a side, FEM analysis is used to calculate the shear rigidity in the tire width direction with respect to a region of 20 mm×whole circumference of tire in tire width direction, and the average value is determined and defined as the shear rigidity with respect to each position in the tire width direction.

Here, parameters about the thickness direction and the material can be appropriately set depending on an individual tire.

In the tire of the present invention, the value of the negative rate and the value of the ratio Gs/Gc of shear rigidity are defined as described above, and thus the pattern rigidity can be made uniform in the tire width direction and steering stability, particularly, the feeling of falling during rolling can be enhanced.

In addition, in the tire of the present invention, the negative rate of the entire tread surface portion can be suitably 4% to 9% from the viewpoint that steering stability during high-speed running is ensured.

It is important in the tire of the present invention that not only at least one center main groove be placed preferably not so as to traverse the tire equatorial plane CL, but also the value of the negative rate and the value of the ratio Gs/Gc of shear rigidity be defined as described above, and thus the desired effects of the present invention can be obtained. Any point other than the above is not particularly limited, and can be suitably configured as described below.

In the tire of the present invention, when a ground contact surface during straight running is defined as a center region and paired regions located outside the center region in a tire width direction are each a shoulder region in the tread surface portion, the ratio Nc/Ns between the negative rate Nc of the center region and the negative rate Ns of the shoulder region is preferably 40% to 120%, as expressed in percentage. Thus, the pattern rigidity can be made more uniform in the tire width direction and steering stability, particularly, the feeling of falling during rolling can be more enhanced. In the present invention, the ratio Nc/Ns of the negative rates is suitably 40% to 95%. In particular, in a case where the present invention is applied to a front tire, the ratio Nc/Ns of the negative rates is preferably 40% to 43%, and in a case where the present invention is applied to a rear tire, the ratio Nc/Ns of the negative rates is preferably 80% to 100%.

In addition, in the tire of the present invention, the distance d between the center main grooves placed by sandwiching the tire equatorial plane CL is preferably 1% to 20%, more preferably 10% to 15% of the tread width TW. The distance d is in the above range, thereby enabling shear rigidity to be made uniform and enabling the feeling of falling-down during cornering to be improved. The distance d means the minimum value in measurement of the distance in the tire width direction between inner ends in the tire width direction of the center main grooves placed by sandwiching the tire equatorial plane CL, along a tread surface.

Furthermore, in the tire of the present invention, the angle θ1 of the extending direction to the tire circumferential direction of the center main groove is preferably 0° to 30°, more preferably 10° to 15°. The angle θ1 is in the above range, thereby enabling shear rigidity to be made uniform. In the present invention, the angle θ1 is defined as the angle of a straight line connecting ends in the tire circumferential direction of the center main groove, to the tire circumferential direction.

An angle θ1-11 of a straight line connecting ends 11*a* and 11*b* in the tire circumferential direction of one center main groove 11, to the tire circumferential direction, is meant in the front tire 100 illustrated in FIG. 1, and angles θ1-21 and θ1-22 of respective straight lines connecting ends 21*a* and 21*b* and ends 22*a* and 22*b* in the tire circumferential direction of two center main grooves 21 and 22, to the tire circumferential direction, are meant in the rear tire 200 illustrated in FIG. 2.

Moreover, in the tire of the present invention, when ends in the tire circumferential direction of the center main groove are connected to provide a line segment and a point at which a perpendicular line to a midpoint M of the line segment and an inside groove wall in the tire width direction of the center main groove intersect is defined as X, an angle θ2 between two straight lines connecting the point X and the respective ends in the tire circumferential direction of the center main groove is preferably 0° to 40°, more preferably 10° to 15°. The angle θ2 is in the above range, thereby enabling the center main groove to have a curved shape, and enabling pattern rigidity in the tire width direction to be made more uniform.

In the front tire 100 illustrated in FIG. 1, when ends 11*a* and 11*b* in the tire circumferential direction of one center main groove 11 are connected to provide a line segment and a point at which a perpendicular line to a midpoint M of the line segment and an inside groove wall 11A in the tire width direction of the center main groove 11 intersect is defined as X, an angle θ2-11 between two straight lines connecting the point X and the respective ends 11*a* and 11*b* in the tire circumferential direction of the center main groove 11 is meant. In the rear tire 200 illustrated in FIG. 3, when ends 21*a* and 21*b* and ends 22*a* and 22*b* in the tire circumferential direction of two center main grooves 21 and 22 are respectively connected to line segments and points at which perpendicular lines to midpoints M-1 and M-2 of the line segments and inside groove walls 21A and 22A in the tire width direction of the center main grooves 21 and 22 are defined as X-1 and X-2, an angle θ2-21 between two straight lines connecting the point X-1 and the respective ends 21*a* and 21*b* and an angle θ2-22 between two straight lines connecting the point X-2 and the respective ends 22*a* and 22*b* in the tire circumferential direction of the center main grooves 21 and 22 are meant.

Moreover, in the tire of the present invention, at least one of the center main grooves has preferably one or more widened portions in which at least one of an outside groove wall in the tire width direction and an inside groove wall in the tire width direction broadens outside in the groove width direction, or also preferably has two or more such widened portions. In the tire of the present invention, in a case where the center main groove has two or more widened portions, a depressed portion is formed between the widened portions. In this case, when the maximum value of the groove widths of the widened portions of the center main groove is defined as the maximum groove width W, the minimum groove width w being the minimum value of the groove widths of the depressed portions is preferably 20% to 60%, more preferably 30% to 50% of the maximum groove width W. A depressed portion satisfying the above conditions can be provided on the center main groove, thereby allowing rigidity not to be too low.

In the present invention, the groove widths of the widened portion and the depressed portion of the center main groove mean the maximum value and the minimum value of groove widths measured perpendicularly to an inside groove wall in the tire width direction of the center main groove.

In the front tire 100 illustrated in FIG. 1, the center main groove 11 has two widened portions 11W-1 and 11W-2 in which an outside groove wall 11B in the tire width direction, in an inside groove wall 11A in the tire width direction and the outside groove wall 11B in the tire width direction, broadens outward in the groove width direction, and a depressed portion 11C is formed between these two widened portions 11W-1 and 11W-2. The maximum value of the groove widths in the two widened portions 11W-1 and 11W-2 is the maximum groove width W11, and the minimum value of the groove widths in the depressed portion 11C is the minimum groove width w11. In the rear tire 200 illustrated in FIG. 2, the center main groove 21 has two widened portions 21W-1 and 21W-2 in which both an inside groove wall 21A in the tire width direction and an outside groove wall 21B in the tire width direction broaden outward in the groove width direction, and a depressed portion 21C is formed between these two widened portions 21W-1 and 21W-2. The maximum value of the groove widths in the two widened portions 21W-1 and 21W-2 is the maximum groove width W21, and the minimum value of the groove widths in the depressed portion 21C is the minimum groove width w21. A center main groove 22 in FIG. 2 has one widened portion 22W in which an outside groove wall 22B in the tire width direction, in an inside groove wall 22A in the tire width direction and the outside groove wall 22B in the tire width direction, broadens outward in the groove width direction, and does not have a depressed portion.

In the present invention, a depressed portion of the center main groove is preferably provided on a central portion in the tire circumferential direction of the center main groove, for example, on an area of 40% to 60% of the length Lg in the tire circumferential direction of the center main groove.

In the tire of the present invention, in a case where one or more widened portions are provided on the center main groove, a raised portion is preferably provided on a groove bottom in such a widened portion. Thus, drainage along an inside groove wall in the tire width direction and an outside groove wall in the tire width direction can be improved, and drainage ability can be enhanced. It is preferable for favorably obtaining such an effect that the shape of the raised portion be a shape along the extending direction of the center main groove having such widened portion(s).

The raised portion may be provided on all widened portions present in one center main groove or may be provided on only some widened portions, and may be provided on all center main grooves each having a widened portion or may be provided on only some of such center main grooves. In particular, one or two such raised portions are preferably provided on one center main groove in the present invention.

In the rear tire 200 illustrated in FIG. 3, one raised portion with respect to each of the two widened portions 21W-1 and 21W-2 of the center main groove 21, namely, two raised portions 121-1 and 121-2 in total are provided, and one raised portion 122 is provided on one widened portion 22W of the center main groove 22. In the front tire 100 illustrated in FIG. 1, the raised portion is not provided on the widened portions 11W-1 and 11W-2 of the center main groove 11.

The height of the raised portion is not particularly limited as long as it is less than the depth of the center main groove having the widened portion, and is preferably 90% or less of the depth of the center main groove having the widened portion. The extending length of the raised portion is preferably 30 to 50% of that of the widened portion.

In the tire of the present invention, as in the center main groove 21 of the rear tire 200 illustrated in FIG. 3, preferably a site in which an inside groove wall 21A in the tire width direction and an outside groove wall 21B in the tire width direction broaden outward in the groove width direction is included at the same number and such a site in which an inside groove wall 21A in the tire width direction and an outside groove wall 21B in the tire width direction broaden outward in the groove width direction is placed so as to form a pair, to provide raised portions 121-1 and 121-2 on groove bottoms of the thus formed widened portions 21W-1 and 21W-2. Also in this case, a raised portion may be provided on all widened portions or may be provided some widened portions.

Moreover, in the tire of the present invention, the overlap length in the tire circumferential direction between the center main grooves placed by sandwiching the tire equatorial plane CL is preferably 10% to 90%, more preferably 15% to 85% of the length Lg in the tire circumferential direction of the center main groove, as expressed in percentage. Thus, the rigidity of a center portion can be decreased, and the rigidity of a shoulder portion can be relatively increased, thereby resulting in enhancements in steering stability and the feeling of falling during rolling.

The overlap length means the length of overlapping in the tire circumferential direction of the center main grooves placed by sandwiching the tire equatorial plane CL, and is the sum per center main groove, of the length in the tire circumferential direction of a portion in which the center main grooves are overlapped by sandwiching the tire equatorial plane when viewed in the tire width direction.

In the tire of the present invention, a center main groove larger in length in the tire circumferential direction is placed in a center region close to the tire equatorial plane CL in the tread surface portion, and furthermore a shoulder main groove can be provided in a shoulder region outside in the tire width direction of the center region. In the present invention, the shoulder main groove means a main groove other than the center main groove. In the front tire 100 illustrated in FIG. 1, shoulder main grooves 31, 32, and 33 are provided. In the rear tire 200 illustrated in each of FIGS. 2 and 3, shoulder main grooves 41, 42, and 43 are provided.

Such shoulder main grooves are preferably placed at a substantially equal interval in the tire circumferential direction in the shoulder region. Here, the "substantially equal interval" means that the intergroove distances in the tire circumferential direction, as measured between opening end portions of tire tread surface portions, of respective shoulder main grooves plurally placed, are substantially the same.

In the front tire 100 illustrated in FIG. 1, when an intergroove distance L1 between shoulder main grooves 31 and 32, an intergroove distance L2 between shoulder main grooves 32 and 33, and an intergroove distance L3 between shoulder main grooves 33 and 31 in these three shoulder main grooves 31, 32, and 33 are defined, $L1 \approx L2 \approx L3$ is satisfied. In the rear tire 200 illustrated in FIG. 3, one center main groove 22 extends to the shoulder region, and thus, when an intergroove distance L4 between shoulder main grooves 41 and 42, an intergroove distance L5 between shoulder main grooves 42 and 43, an intergroove distance L6 between the shoulder main groove 43 and the center main groove 22, and an intergroove distance L7 between the center main groove 22 and the shoulder main groove 41 in these three shoulder main grooves 41, 42, and 43 and the center main groove 22 are defined, $L4 \approx L5 \approx L6 \approx L7$ is satisfied.

In the present invention, the intergroove distance can be measured, for example, at the same position in the tire width direction, at which a plurality of shoulder main grooves is overlapped and placed when viewed in the tire circumferential direction. The "intergroove distances being substantially the same" means that an error in manufacturing is included, and, for example, those within an error range of ±20% on the millimeter base are regarded as being substantially the same.

The angle θ3 of the extending direction to the tire circumferential direction of the shoulder main groove is preferably 20° to 60°, more preferably 35° to 50°. The angle θ3 is in the above range, thereby enabling shear rigidity to be made uniform. In the present invention, the angle θ3 is defined as the angle of a straight line connecting ends in the tire circumferential direction of the shoulder main groove, to the tire circumferential direction.

In the front tire 100 illustrated in FIG. 1, angles θ3-31, θ3-32, and θ3-33 of respective straight lines connecting ends 31*a* and 31*b*, ends 32*a* and 32*b*, and ends 33*a* and 33*b* in the tire circumferential direction of three shoulder main grooves 31, 32, and 33, to the tire circumferential direction, are meant. In the rear tire 200 illustrated in FIG. 3, angles θ3-41, θ3-42, and θ3-43 of respective straight lines connecting ends 41*a* and 41*b*, ends 42*a* and 42*b*, and ends 43*a* and 43*b* in the tire circumferential direction of three shoulder main grooves 41, 42, and 43, to the tire circumferential direction, are meant.

In this case, the angle θ3 of the extending direction to the tire circumferential direction of the shoulder main groove is preferably larger than the angle θ1 of the extending direction to the tire circumferential direction of the center main groove. Thus, not only shear rigidity can be made uniform, but also, in particular, drainage ability can be enhanced on a center portion during straight traveling and on a shoulder portion during banking.

More specifically, in the front tire 100 illustrated in FIG. 1, the relationship of angles of one center main groove 11 and three shoulder main grooves 31, 32, and 33 preferably satisfies θ3-31≥θ3-32>θ3-33>θ1-11. In the rear tire 200 illustrated in each of FIGS. 2 and 3, the relationship of angles of two center main grooves 21 and 22 and three shoulder main grooves 41, 42, and 43 preferably satisfies θ3-41≥θ3-42>θ3-43>θ1-22>θ1-21.

In the tire of the present invention, the depths of the center main groove and the shoulder main groove are not particularly limited, and can be usually 2.0 to 11 mm and are suitably 3.5 to 6.5 mm.

As illustrated in the drawings, patterns each including a group of grooves, in which a plurality of center main grooves and shoulder main grooves are defined as one set, are symmetrically shaped about the tire equatorial plane CL, and are disposed repeatedly in the tire circumferential direction with being displaced by ½ of the placement pitch, substantially in the present invention. In the present invention, the placement pitch of the patterns means one unit of repeating in the tire circumferential direction, of a design formed by center main grooves and shoulder main grooves provided on a tread surface portion. The placement pitch of the patterns in the present invention is not particularly limited, and can be, for example, about 1/20 to ⅕ of the whole perimeter of the tire.

Figure 4:
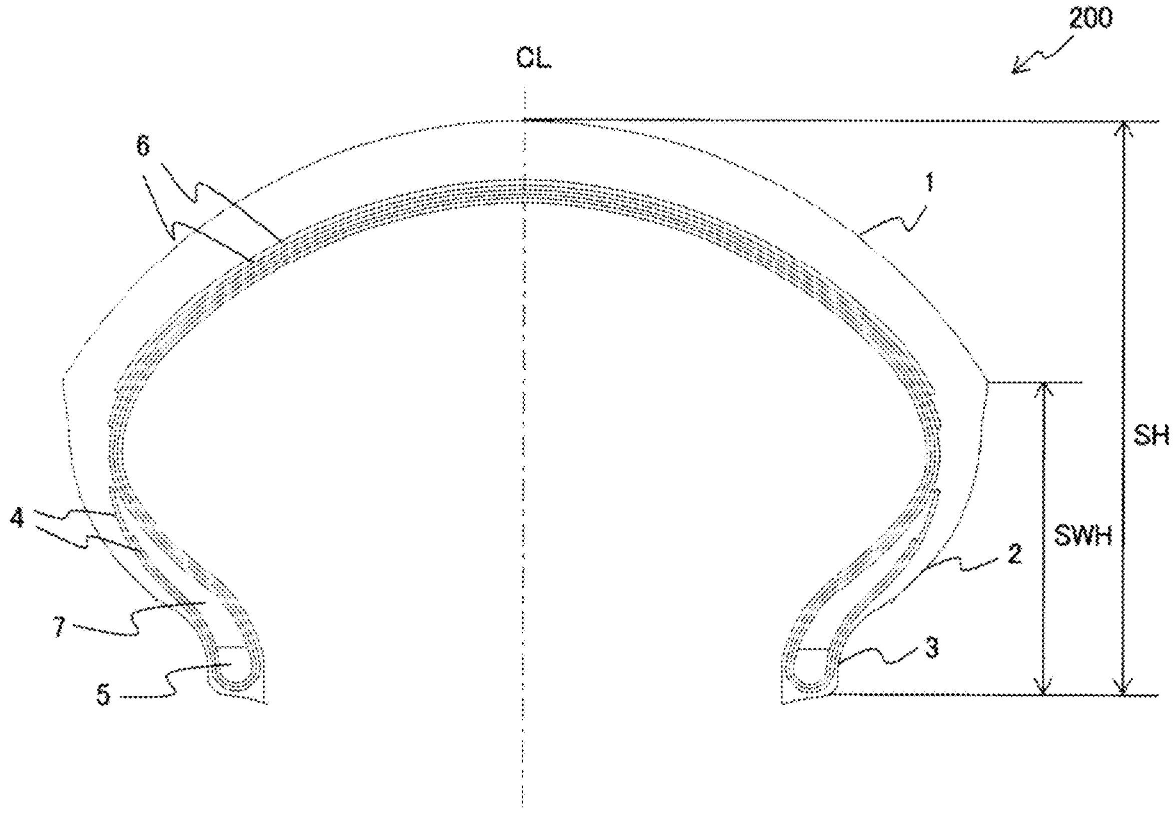
FIG. 4 A width-direction cross-sectional view illustrating one example of the tire for two-wheelers of the present invention.

FIG. 4 is a width-direction cross-sectional view illustrating one example of a rear tire as one example of the motorcycle tire of the present invention. As illustrated in FIG. 4, the tire 200 of the present invention has a tread portion 1 forming a ground contact portion, and paired sidewall portions 2 and bead portions 3 each extending inward in the tire radial direction from both ends of the tread portion.

The tire 200 illustrated is provided with two carcass plies 4 striding between the paired bead portions 3 and extending in a toroid manner, as a backbone. In the present invention, the carcass plies 4 are each formed by arranging textile codes relatively high in elasticity, in parallel with each other, and the numbers thereof may be at least one, or may be three or more. Both ends of each of the carcass plies 4 may be engaged with being folded back around a bead core 5 from the inside to the outside of the tire as illustrated or may be engaged with being sandwiched from both sides by a bead wire, at each of the bead portions 3, and any securing method may be adopted.

Two belt layers 6 are placed outside in the tire radial direction of the carcass plies 4 in the tread portion 1 in the tire 200 illustrated. In the present invention, the belt layers 6 can be placed by at least one layer, and may be formed from two or more tilted belt layers placed so that code directions are mutually crossed between the layers, or may be formed by only one or more spiral belts made of a code covered with rubber, wound in a spiral manner in the tire circumferential direction. Examples of the reinforcing material constituting each of the belt layers 6 include a nylon fiber, aromatic polyamide (trade name: Kevlar (registered trademark)), and steel. Among these, aromatic polyamide and steel are each a reinforcing material which can inhibit swelling of a tread part without being stretched even at a high temperature.

In the tire 200 of the present invention, a bead filler 7 can be placed outside in the tire radial direction of the bead core 5 and an inner liner not illustrated can be placed in the innermost layer of the tire.

Furthermore, in the tire of the present invention, the ratio of the height SWH at a position where the tire has the maximum width, to the tire cross section height SH, is preferably in the range of 40% to 75%. The ratio SWH/SH between the tire cross section height SH and the height SWH at a position where the tire has the maximum width is in the range of 40% to 75%, as expressed in percentage, and thus a tire can be obtained which has an appropriate ground contact surface and which is excellent in steering stability. In particular, steering stability in the state of banking during cornering running of a two-wheeler can be enhanced. The tire cross section height SH here refers to ½ of the difference between the outer diameter of the tire and the rim diameter of the rim prescribed in the industrial standard.

The tire of the present invention can be applied to both a front tire and a rear tire of a motorcycle, and can also be applied to any tire of a radial structure and a bias structure. The tire of the present invention is also useful as a sport tire because steering stability, particularly, the feeling of falling during rolling is enhanced as compared with conventional one.

EXAMPLES

Hereinafter, the present invention is described in more detail with reference to specific Examples.

Example 1

Produced were a motorcycle front tire (tire size 120/70ZR17M/C) in which a directional pattern illustrated in FIG. 1 was provided on a tread surface portion, and a rear tire (tire size 190/55ZR17M/C) in which a directional pattern illustrated in FIG. 2 was provided on a tread surface portion. These test tires satisfied the following conditions.

Distance d between center main grooves placed by sandwiching tire equatorial plane: 5% of (front) tread width TW, 7% of (rear) tread width TW.

Angle θ1-11 of center main groove 11: 17°, angle θ1-21 of center main groove 21: 10°, angle θ1-22 of center main groove 22: 25°.

Angle θ2-11 of center main groove 11: 10°, angle θ2-21 of center main groove 21: 5°, angle θ2-22 of center main groove 22: 6°.

Minimum groove width w11 of center main groove 11: 50% of maximum groove width W11, minimum groove width w21 of center main groove 21: 50% of maximum groove width W21, minimum groove width w22 of center main groove 22: 39% of maximum groove width W22.

Overlap length of center main grooves placed by sandwiching tire equatorial plane: 40% of length Lg in tire circumferential direction of (front) center main groove 11, 15% of length Lg in tire circumferential direction of (rear) center main groove 21, 82% of length Lg in tire circumferential direction of center main groove 22.

Angle θ3-31 of shoulder main groove 31: 35°, angle θ3-32 of shoulder main groove 32: 45°, angle θ3-33 of shoulder main groove 33: 35°, angle θ3-41 of shoulder main groove 41:45°, angle θ3-42 of shoulder main groove 42: 45°, angle θ3-43 of shoulder main groove 43: 30°.

The resulting front tire and rear tire were respectively mounted to rims of rim sizes MT 3.50×17 and MT 6.00×17, and respectively charged with inner pressures of 250 kPa and 290 kPa, and thus were fitted to a commercially available motorcycle. This motorcycle was subjected to actual vehicle sensory evaluation with two test riders, and scored with respect to yaw responsibility and the feeling of falling during rolling, and then the average scores were determined. Specifically, the test riders ran large and small corners, and evaluated yaw responsibility during rounding and the feeling of falling during rolling on a scale of one to ten.

Comparative Example 1

Figure 5:
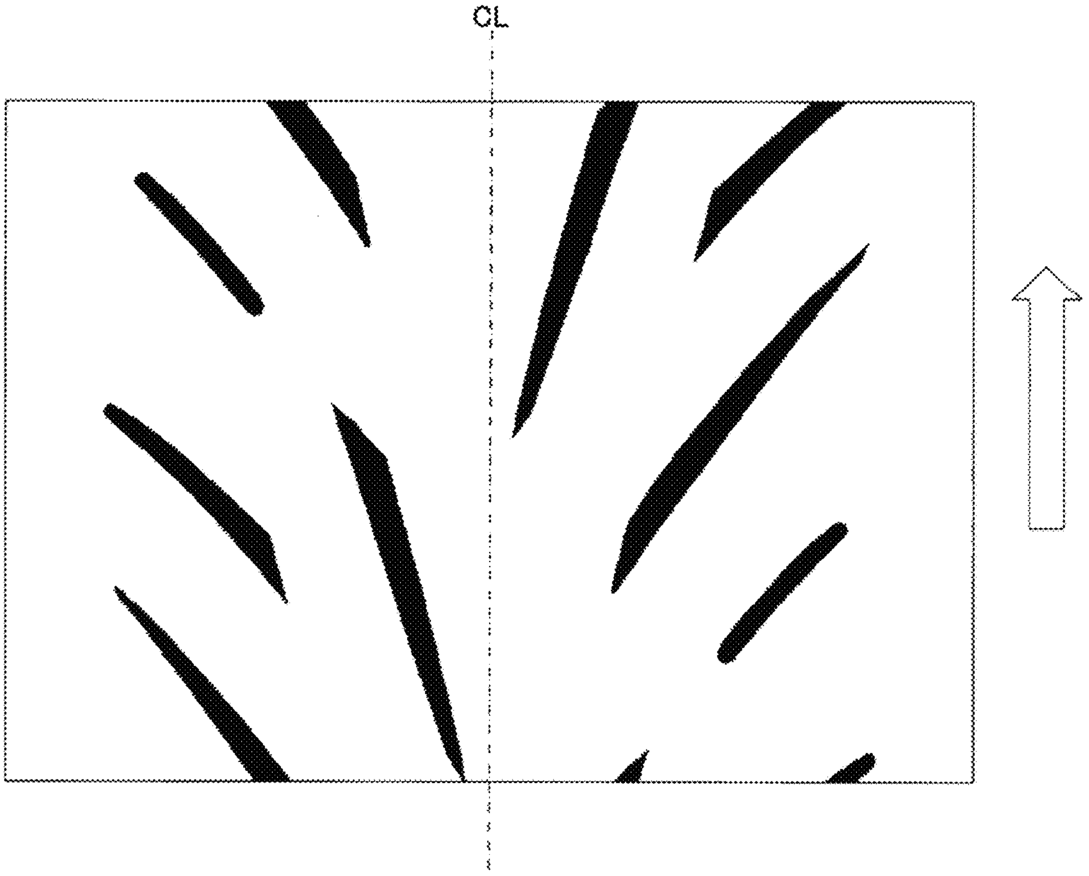
FIG. 5 A partially developed view illustrating a tread surface portion of a front tire of Comparative Example.
Figure 6:
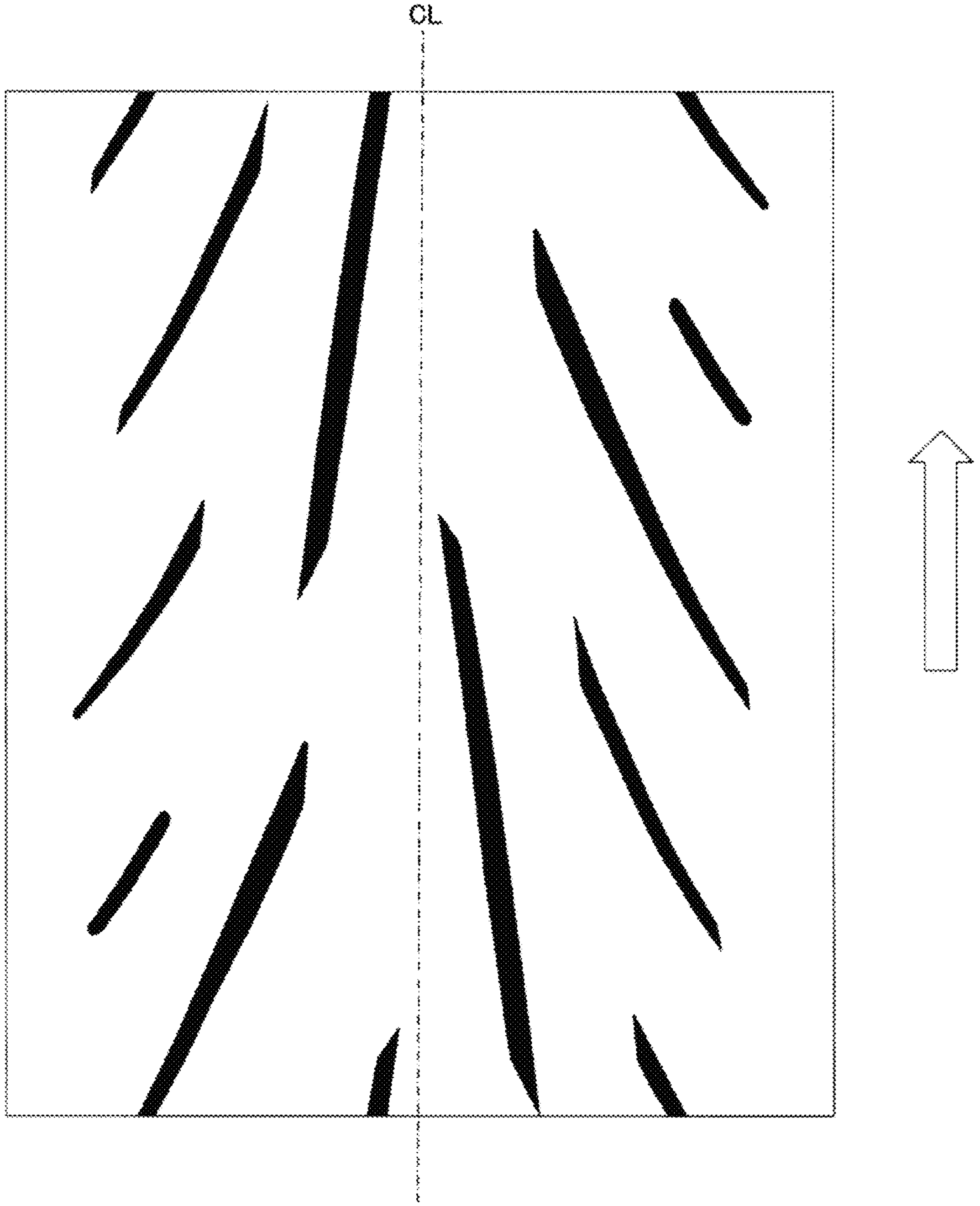
FIG. 6 A partially developed view illustrating a tread surface portion of a rear tire of Comparative Example.

The same evaluation as in Example was performed to determine the average scores except that tires having tread patterns respectively illustrated in FIG. 5 and FIG. 6 were fitted as a front tire and a rear tire. Each arrow in FIGS. 5 and 6 indicates a tire rotation direction.

The evaluation results were indicated by the difference in score with Comparative Example as a control. It is indicated that, as the present evaluation score is larger in number, evaluation by riders is better. The results are shown in Table 1 below, together with the values of the shear rigidity ratio Gs/Gc, the negative rate of the entire tread surface portion, and the ratio Nc/Ns of the negative rates.

TABLE 1

| | Comparative Example | | Example | |
|---|---|---|---|---|
| | Front tire | Rear tire | Front tire | Rear tire |
| Shear rigidity ratio Gs/Gc (%) *1 | 83 | 93 | 96 | 98 |
| Negative rate (%) of whole tread surface | 9.0 | 7.8 | 7.6 | 7.4 |
| Ratio Nc/Ns (%) of negative rates *2 | 44 | 56 | 41 | 94 |

TABLE 1-continued

| | Comparative Example | | Example | |
|---|---|---|---|---|
| | Front tire | Rear tire | Front tire | Rear tire |
| Yaw responsibility (sensory evaluation) | Control | | +0.2 | |
| Feeling of falling in rolling (sensory evaluation) | Control | | +0.4 | |

*1 A value of the ratio Gs/Gc between the shear rigidity Gs at a position of ¼ of the tread width TW from the tread edge TE as measured in the tire width direction and the shear rigidity Gc at a position of ½ of the tread width TW from the tread edge TE as measured in the tire width direction, in the tread surface portion, as determined by FEM analysis.

*2 A value of the ratio Nc/Ns between the negative rate Nc of the center region and the negative rate Ns of the shoulder region under the assumption that the ground contact surface during straight running is defined as a center region and paired regions located outside the center region in the tire width direction are each a shoulder region in the tread surface portion.

It is clear as shown in the above Table that predetermined shear rigidity ratio and negative rate can be satisfied to allow a motorcycle tire enhanced in steering stability, particularly, the feeling of falling during rolling to be realized.

DESCRIPTION OF SYMBOLS

1 tread portion
2 sidewall portion
3 bead portion
4 carcass ply
5 bead core
6 belt layer
7 bead filler
11, 21, 22 center main groove
11*a*, 11*b*, 21*a*, 21*b*, 22*a*, 22*b* end in tire circumferential direction of center main groove
11A, 21A, 22A inside groove wall in tire width direction of center main groove
11B, 21B, 22B outside groove wall in tire width direction of center main groove
11W-1, 11W-2, 21W-1, 21W-2, 22W widened portion
11C, 21C depressed portion
31, 32, 33, 41, 42, 43 shoulder main groove
31*a*, 31*b*, 32*a*, 32*b*, 33*a*, 33*b*, 41*a*, 41*b*, 42*a*, 42*b*, 43*a*, 43*b* end in tire circumferential direction of shoulder main groove
100 front tire
121-1, 121-2, 122 raised portion
200 rear tire

The invention claimed is:

1. A motorcycle tire in which a directional pattern comprising at least one center main groove is provided on a tread surface portion, wherein a negative rate of the entire tread surface portion is 10% or less, and a ratio Gs/Gc between shear rigidity Gs at a position of ¼ of a tread width TW from a tread edge as measured in a tire width direction and shear rigidity Gc at a position of ½ of a tread width TW from a tread edge as measured in a tire width direction, in the tread surface portion, is 95% to 100%;

wherein, when ends in a tire circumferential direction of the at least one center main groove are connected to provide a line segment and a point at which a perpendicular line to a midpoint of the line segment and an inside groove wall in a tire width direction of the center main groove intersect is defined as X, an angle θ2 between two straight lines connecting the point X and the respective ends in a tire circumferential direction of the center main groove is 10 to 15°.

2. The motorcycle tire according to claim 1, wherein the center main groove is placed not so as to traverse a tire equatorial plane.

3. The motorcycle tire according to claim 2, wherein, when a ground contact surface during straight running is defined as a center region and paired regions located outside the center region in a tire width direction are each a shoulder region in the tread surface portion, a ratio Nc/Ns between a negative rate Nc of the center region and a negative rate Ns of the shoulder region is 40% to 120%.

4. The motorcycle tire according to claim 2, wherein the at least one center main groove comprises two center main grooves and a distance d between the center main grooves placed by sandwiching a tire equatorial plane corresponds to 1% to 20% of the tread width TW.

5. The motorcycle tire according to claim 2, wherein an angle θ1 of an extending direction to a tire circumferential direction of the center main groove is 0° to 30°.

6. The motorcycle tire according to claim 2, wherein at least one of the center main groove has two or more widened portions in which at least one of an outside groove wall in a tire width direction and an inside groove wall in a tire width direction broadens outside in a groove width direction, and, when a maximum value of groove widths in the widened portions is defined as a maximum groove width W, a minimum groove width w being a minimum value of groove widths of depressed portions formed between the widened portions is 20% to 60% of the maximum groove width W.

7. The motorcycle tire according to claim 2, wherein the at least one center main groove comprises two center main grooves and an overlap length of the center main grooves placed by sandwiching a tire equatorial plane, in a tire circumferential direction, is 10% to 90% of a length Lg of each of the center main grooves in a tire circumferential direction.

8. The motorcycle tire according to claim 2, wherein at least one of the center main grooves has one or more widened portions in which at least one of an outside groove wall in a tire width direction and an inside groove wall in a tire width direction broadens outside in a groove width direction, and a raised portion is provided on a groove bottom of each of the widened portions.

9. The motorcycle tire according to claim 2, wherein the tread surface portion further has a shoulder main groove, and an angle θ3 of an extending direction to a tire circumferential direction of the shoulder main groove is 20° to 60°.

10. The motorcycle tire according to claim 2, wherein the tread surface portion further has a shoulder main groove, and an angle θ3 of an extending direction to a tire circumferential direction of the shoulder main groove is larger than an angle θ1 of an extending direction to a tire circumferential direction of the center main groove.

11. The motorcycle tire according to claim 1, wherein, when a ground contact surface during straight running is defined as a center region and paired regions located outside the center region in a tire width direction are each a shoulder region in the tread surface portion, a ratio Nc/Ns between a negative rate Nc of the center region and a negative rate Ns of the shoulder region is 40% to 120%.

12. The motorcycle tire according to claim 1, wherein the at least one center main groove comprise two center main grooves and a distance d between the center main grooves placed by sandwiching a tire equatorial plane corresponds to 1% to 20% of the tread width TW.

13. The motorcycle tire according to claim 1, wherein an angle θ1 of an extending direction to a tire circumferential direction of the center main groove is 0° to 30°.

14. The motorcycle tire according to claim 1, wherein at least one of the center main groove has two or more widened portions in which at least one of an outside groove wall in a tire width direction and an inside groove wall in a tire width direction broadens outside in a groove width direction, and, when a maximum value of groove widths in the widened portions is defined as a maximum groove width W, a minimum groove width w being a minimum value of groove widths of depressed portions formed between the widened portions is 20% to 60% of the maximum groove width W.

15. The motorcycle tire according to claim 1, wherein the at least one center main groove comprises two center main grooves and an overlap length of the center main grooves placed by sandwiching a tire equatorial plane, in a tire circumferential direction, is 10% to 90% of a length Lg of each of the center main grooves in a tire circumferential direction.

16. The motorcycle tire according to claim 1, wherein at least one of the center main grooves has one or more widened portions in which at least one of an outside groove wall in a tire width direction and an inside groove wall in a tire width direction broadens outside in a groove width direction, and a raised portion is provided on a groove bottom of each of the widened portions.

17. The motorcycle tire according to claim 1, wherein the tread surface portion further has a shoulder main groove, and an angle θ3 of an extending direction to a tire circumferential direction of the shoulder main groove is 20° to 60°.

18. The motorcycle tire according to claim 1, wherein the tread surface portion further has a shoulder main groove, and an angle θ3 of an extending direction to a tire circumferential direction of the shoulder main groove is larger than an angle θ1 of an extending direction to a tire circumferential direction of the center main groove.

* * * * *